United States Patent
Liu et al.

(10) Patent No.: US 10,202,001 B2
(45) Date of Patent: Feb. 12, 2019

(54) QUICK RELEASE DEVICE FOR BICYCLE WHEEL

(71) Applicant: LEE CHI ENTERPRISES COMPANY LTD., Changhua County (TW)

(72) Inventors: Wen-Tsung Liu, Changhua County (TW); Jr-Yuan Jang, Changhua County (TW)

(73) Assignee: LEE CHI ENTERPRISES COMPANY LTD., Changhua, Changhua County (TW)

( * ) Notice: Subject to any disclaimer, the term of this patent is extended or adjusted under 35 U.S.C. 154(b) by 114 days.

(21) Appl. No.: 15/611,291

(22) Filed: Jun. 1, 2017

(65) Prior Publication Data

US 2018/0264880 A1    Sep. 20, 2018

(30) Foreign Application Priority Data

Mar. 17, 2017    (TW) .............................. 106108958 A (51) Int. Cl.
*B60B 27/02*    (2006.01)
*B62K 25/02*    (2006.01)

(52) U.S. Cl.
CPC .......... *B60B 27/026* (2013.01); *B62K 25/02* (2013.01)

(58) Field of Classification Search
CPC ............................... B60B 27/02; B62K 25/02
USPC ..................................................... 301/124.2
See application file for complete search history.

(56) References Cited

U.S. PATENT DOCUMENTS

| | | | | |
|---|---|---|---|---|
| 2008/0211296 A1* | 9/2008 | Takachi | ................. | B62K 25/02 301/124.2 |
| 2009/0261648 A1* | 10/2009 | Cusack | ................. | B62K 25/02 301/124.2 |
| 2013/0328385 A1* | 12/2013 | Kuo | ...................... | B60B 27/026 301/124.2 |

FOREIGN PATENT DOCUMENTS

| | | |
|---|---|---|
| TW | M457653 U | 7/2013 |
| TW | M502622 U | 6/2015 |
| TW | 201540595 A | 11/2015 |
| TW | M531358 U | 11/2016 |
| TW | M536168 U | 2/2017 |

* cited by examiner

*Primary Examiner* — S. Joseph Morano
*Assistant Examiner* — Jean W Charleston
(74) *Attorney, Agent, or Firm* — Muncy, Geissler, Olds & Lowe, P.C.

(57) ABSTRACT

A quick release device for bicycle wheel is disclosed, including a mandrel, a wrench, at least one key, a limiting member, and an elastic member. The mandrel includes a shaft and an axial sleeve positioned at one terminal of the shaft and formed with multiple first grooves. The wrench includes a sleeve mounted on the axial sleeve, and is movable between a first position and a second position. The sleeve includes at least one second groove, wherein the key is positioned within one of the first grooves and the second groove when the sleeve is at the first position; the key is apart from one of the first grooves when the sleeve is the second position. The limiting member fits around the mandrel and includes a stopper. The elastic member is between the key and the stopper. Whereby, the application strength and lifetime can be increased with a lightweight feature.

7 Claims, 7 Drawing Sheets

QUICK RELEASE DEVICE FOR BICYCLE WHEEL

BACKGROUND OF THE INVENTION

1. Technical Field

The present invention is related to an assembling device utilized between a bicycle wheel and a frame, and more particularly to a quick release device for securing or releasing a bicycle wheel onto or from a frame.

2. Description of Related Art

A quick release device for bicycle wheel is an assembling device which can quickly secure a bicycle wheel to a frame, i.e., front fork or rear fork, or release the bicycle wheel from the frame.

Commonly-used quick release devices include two types. One kind of the quick release devices is provided with a wrench including an eccentric cam, and users can use the wrench to secure or loose via the eccentric cam. Another kind of the quick release devices is provided with a mandrel formed with an externally threaded portion at one of its terminals which can be engaged with an internally threaded hole of a bicycle frame, while the other terminal of the mandrel is an operation end. A wrench is fitted to the operation end of the mandrel and can drive the mandrel to rotate while it rotates. Then, the externally threaded portion of the mandrel can be tightened or loosen corresponding to the internally threaded hole of the bicycle frame. Hence, a distance between the wheel and the bicycle can be reduced or increased to accomplish the purpose of installing or releasing the wheel onto or from the bicycle frame.

However, in the above-mentioned quick release device which utilizes thread connection with the bicycle frame, the wrench is usually rotated to an improper position after securing the wheel to the bicycle frame and the angle thereof cannot be changed independently. That is, it is easily interfered with surrounding components or raised riding safety problems.

To solve the problems mentioned above, some manufacturers developed an improved quick release device which the wrench can be rotated independently after securing the wheel to the bicycle frame without affecting other components. For example, referring to Taiwan Patent Application TW 201540595 titled "Adjustable angle push-button type quick release", a quick release device is disclosed. The quick release mandrel of the application includes a quick release handle positioned on its one terminal, while the other terminal of the quick release mandrel is engaged with a screw nut. The quick release handle includes a return spring and a button positioned inside of it, wherein the button is formed with ratchet teeth to be engaged with inner ratchet teeth formed on an internal surface of the quick release handle, and the button is mounted to the quick release mandrel via a screw. When the bicycle wheel is tightly secured, users can press the button to detach the ratchet teeth thereof from the inner ratchet teeth. Whereby, the quick release handle can be rotated and adjusted its angle freely, and then the engagement relation between the button and the quick release handle can be restored by utilizing the elastic force of the return spring.

For manufacturing lightweight bicycles, most of the quick release devices are usually formed with lightweight aluminum alloy. However, the strength of the material is weaker, and the components of the device are easily mutually worn during the operation process. Then, gaps are generated between the components and the arrangement therebetween is loose, and thus the linkage between the components is affected. The aforementioned situation is particularly more obvious between the ratchet teeth. However, if the device is formed with high-strength material such as steel, it cannot meet the lightweight demand because of the weight thereof.

BRIEF SUMMARY OF THE INVENTION

In view of the above, the purpose of the present invention is to provide a quick release device for bicycle wheel which bases on lightweight and operation convenience to incorporate features of application strength and an extended service life.

The present invention provides a quick release device for bicycle wheel which includes a mandrel, a wrench, at least one key, a limiting member and an elastic member. The mandrel includes a combination part, which a plurality of first grooves are formed parallel to the axis of the mandrel on an external annular surface of the combination part. The wrench includes a sleeve rotatably mounted on the combination part, wherein at least one second groove is formed on an internal annular surface of the sleeve and can be opposed to one of the first grooves. The sleeve is moved between a first position and a second position along the axis of the mandrel on the combination part, and the second groove is opposed to one of the first grooves when the sleeve is at the first position. The at least one key is positioned within one of the first grooves and the second groove when the sleeve is at the first position, and the at least one key is detached from one of the first grooves when the sleeve is at the second position. The limiting member is fitted to the combination part of the mandrel and includes a stopper. The elastic member is positioned between the key and the stopper and is adapted to drive the key to move to one of the first grooves.

The advantage of the present invention is to provide operation convenience for users and increase application strength and service life of the quick release device on the basis of maintaining a lightweight feature.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
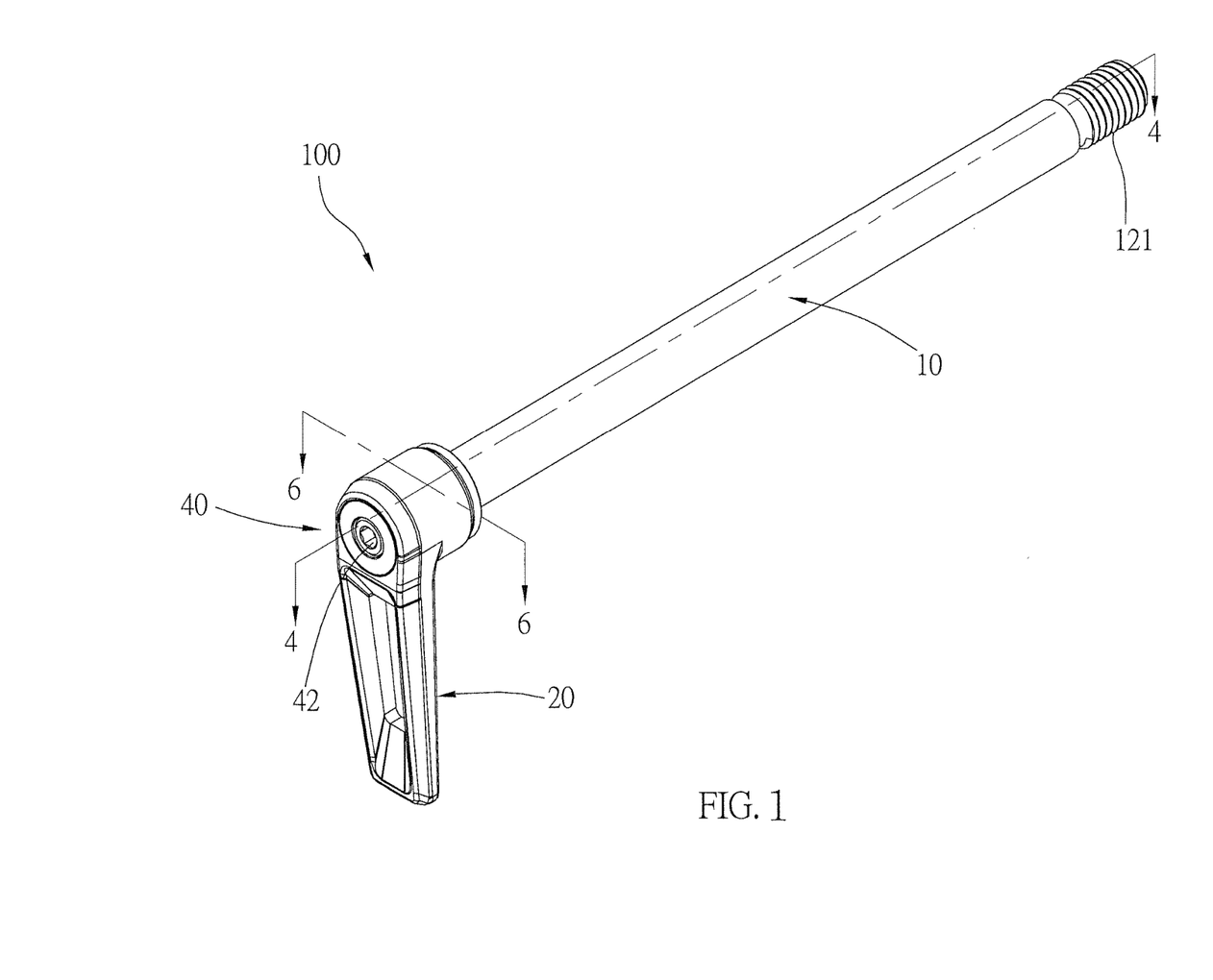
FIG. 1 is a perspective view of a quick release device according to an embodiment of the present invention.
Figure 2:
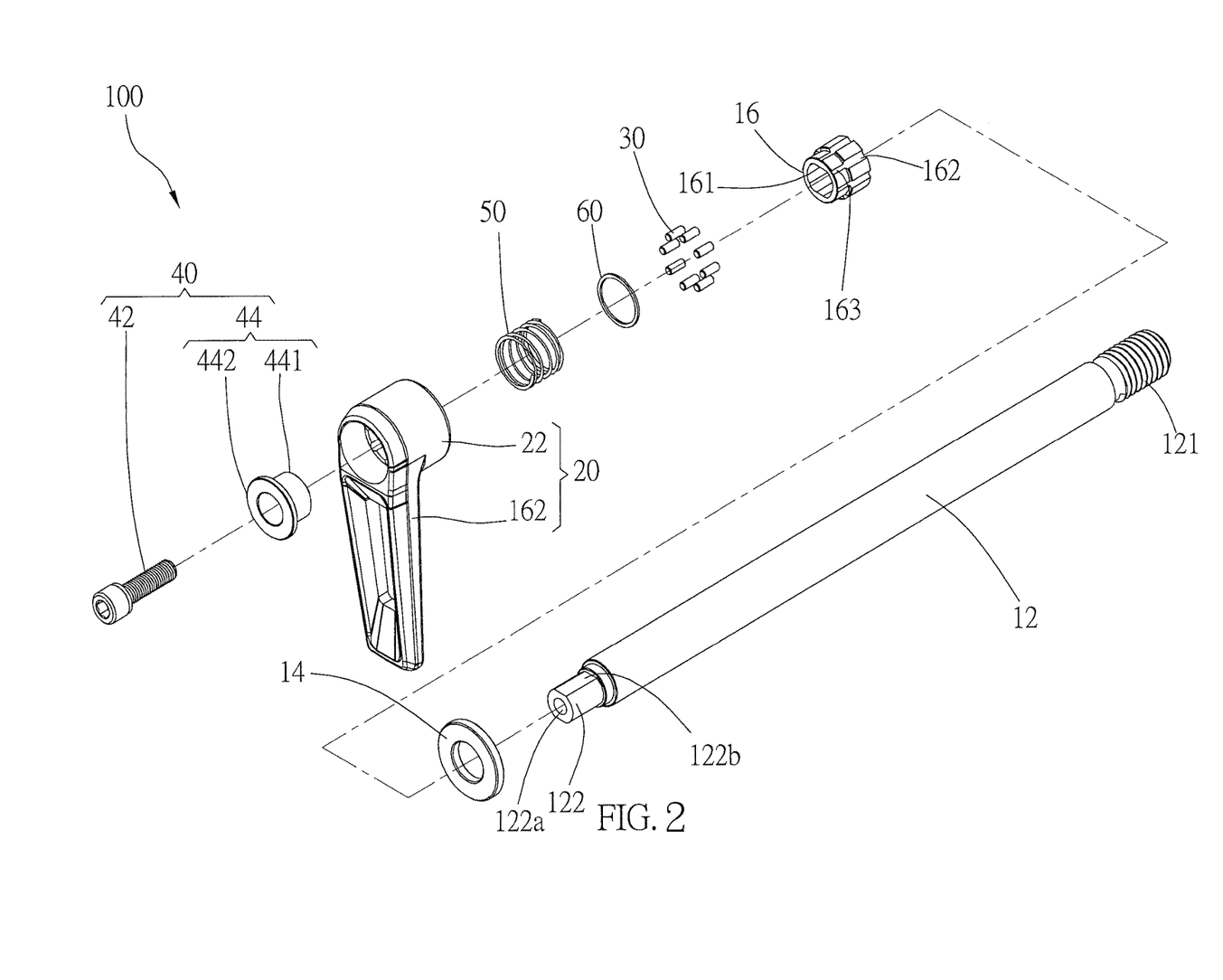
FIG. 2 is a perspective exploded view of the quick release device shown in FIG. 1.

The following illustrative embodiments and drawings are provided to illustrate the disclosure of the present invention, these and other advantages and effects can be clearly understood by persons skilled in the art after reading the disclosure of this specification. As shown in FIG. 1 and FIG. 2, a quick release device 100 of an embodiment according to the present invention is disclosed. The quick release device 100 includes a mandrel 10, a wrench 20, a plurality of keys 30, a limiting member 40, an elastic member 50 and a pad 60. The quick release device 100 is an auxiliary structure adapted to quickly secure or remove wheels onto or from a bicycle frame (front fork or rear fork). In this embodiment, a front fork (not shown) is illustrated as an example, and for the front fork, an internally threaded hole is formed on one of the fork blades thereof.

One terminal of the mandrel 10 is a combination part, and the mandrel 10 includes a shaft 12, a pad ring 14 and an axial sleeve 16. The shaft 12 is adapted to be combined with the front fork, and the shaft 12 includes a body section, a first section 121 and a second section 122. The first section 121 and the second section 122 are respectively positioned at two sides of the body section. The first section 121 includes an externally threaded portion, which is adapted to be engaged with the internally threaded hole of the front fork. An external diameter of the second section 122 is smaller than that of the body section, and the second section 122 includes an internally threaded hole 122a extended axially inside one of its terminals.

The pad ring 14 is mounted on the second section 122 of the shaft 12 and is adjacent to the body section. The pad ring 14 is adapted to tightly abut against one side surface of the other fork blade of the front fork such that the quick release device 100 can be tightly connected with the front fork.

Figure 3:
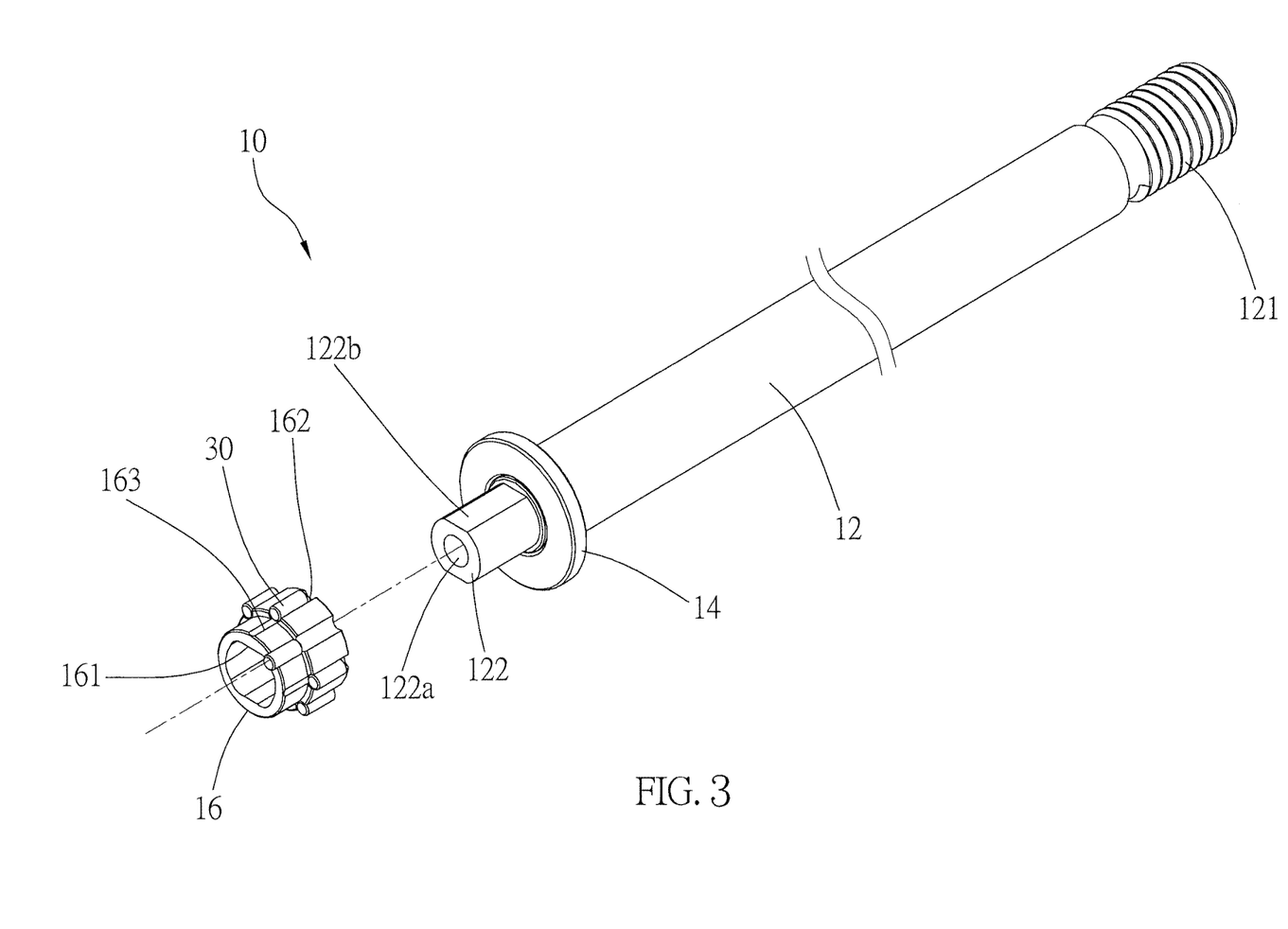
FIG. 3 is an enlarged view of the mandrel shown in FIG. 2.

The axial sleeve 16 is mounted on the second section 122 to constitute the combination part, and the axial sleeve 16 is unrotatably with respect to the shaft 12. Preferably, two flat surfaces 161 are formed on an internal surface of the axial sleeve 16. The external surface of the second section 122 includes two stop planes 122b which are adapted to abut on the two flat surfaces 161. Then, the axial sleeve 16 can drive the shaft 12 to rotate together when it rotates around the shaft 12 axially. As shown in FIG. 3, a plurality of first grooves 162 and guiding grooves 163 are formed on the external surface of the axial sleeve 16, and the plurality of first grooves 162 and guiding grooves 163 are parallel to the axis of the mandrel 10. Wherein, the number of the first grooves 162 is equal to the number of the guiding grooves 163. The first grooves 162 and the guiding grooves 163 are all arc long grooves, wherein each of the first grooves 162 and each of the guiding grooves 163 are connected with each other via their groove bottoms are smoothly connected with each other.

The wrench 20 includes a sleeve 22 and a handle 24. Wherein, the sleeve 22 is rotatably mounted on the axial sleeve 16 and includes a plurality of second grooves 221 formed on its internal surface. Each of the second grooves 221 can be respectively opposed to each of the first grooves 162. Besides, a stop portion 222 is formed on one end of the sleeve 22 and is protruded from the internal surface of the sleeve 22. The sleeve 22 can be moved between a first position P1 and a second position P2 along the axis of the mandrel 10 on the axial sleeve 16. Wherein, each of the second grooves 221 is opposed to each of the first grooves 162 when the sleeve 22 is at the first position P1, while each of the second grooves 221 is opposed to each of the guiding grooves 163 and apart from the first grooves 162 when the sleeve 22 is at the second position P2. The handle 24 is integrally connected with the sleeve 22 and can be held by users to rotate the wrench 20.

Figure 4:
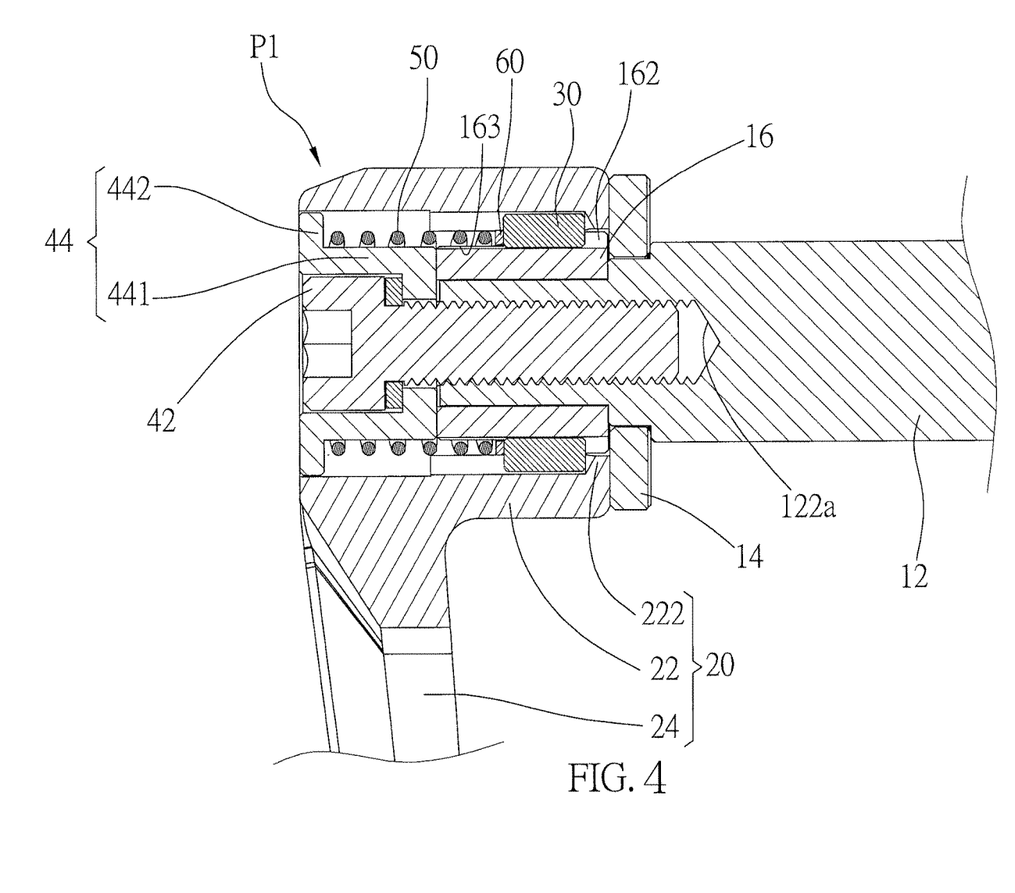
FIG. 4 is a cross-sectional view of the quick release device of FIG. 1 as viewed along line 4-4 of FIG. 1 which shows the corresponding positions of each of the components when the wrench is at the first position.
Figure 5:
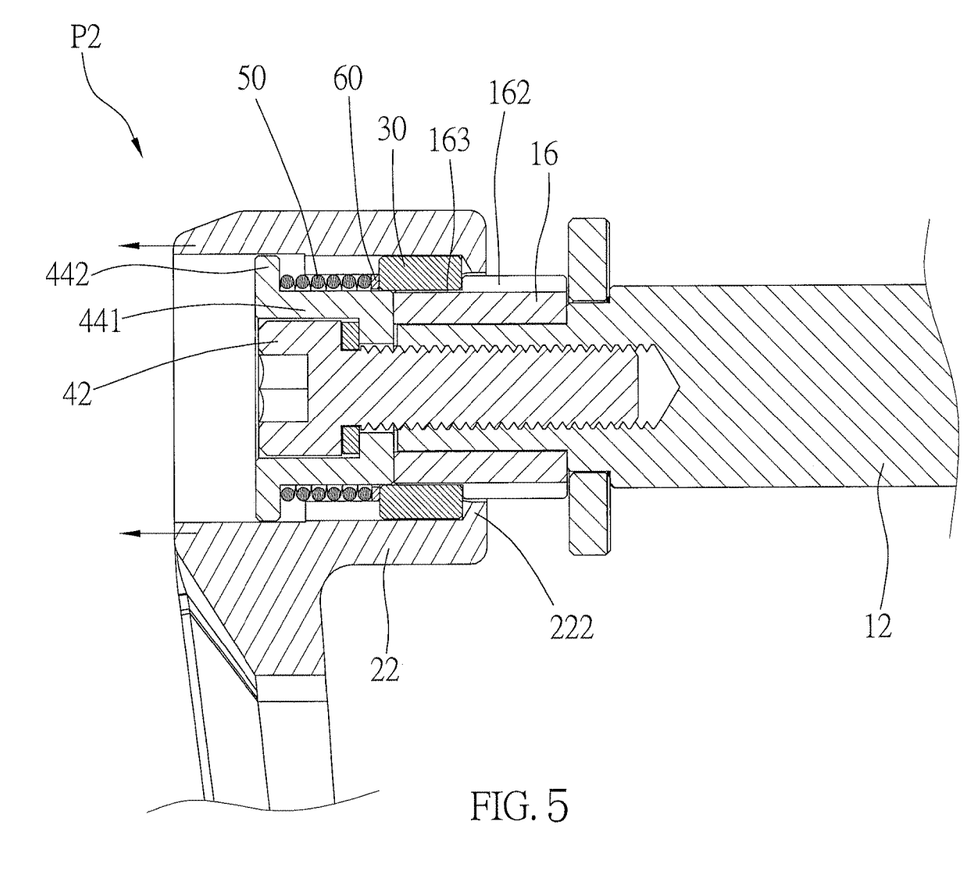
FIG. 5 is a cross-sectional view similar to FIG. 4 which shows the corresponding positions of each of the components when the wrench is at the second position.

The keys 30 are respectively formed as round rods and can be positioned within the first grooves 162. Each of the keys 30 positioned within each of the first grooves can respectively slide between each of the first grooves 162 and each of the corresponding guiding grooves 163. Each of the keys 30 is partially positioned within each of the second grooves 221 of the sleeve 22, and one terminal of each of the keys 30 is abutted against the stop portion 222 of the sleeve 22. As shown in FIG. 4, the keys 30 are respectively positioned within the first grooves 162 and the second grooves 221 when the sleeve 22 is at the first position P1. As shown in FIG. 5, when the sleeve 22 is at the second position P2, the keys 30 are pushed by the stop portion 222 of the sleeve 22 to leave the first grooves 162, and are then positioned within the guiding grooves 163 and the second grooves 221.

The limiting member 40 is fitted to the combination part of the mandrel 10 and is constituted by a bolt 42 and a limiting tube 44. The bolt 42 is fastened in the internally threaded hole 122a of the shaft 12. The limiting tube 44 is a liner which includes a ring 441. Wherein, the ring 441 is mounted on the head of the bolt 42 and is positioned between the head of the bolt 42 and the axial sleeve 16 so as to limit the position of the axial sleeve 16. Besides, the limiting tube 44 further includes a flange 442 protruded from an external surface of the ring 441 which constitutes a stopper of the limiting member 40. In other embodiments, the bolt 42 and the limiting tube 44 can be made integrally as one single element and can be directly mounted to the combination part of the mandrel 12, but it is not limited thereto.

The elastic member 50 includes a spring and is mounted on the ring 441 of the limiting tube 44. Wherein, two ends of the elastic member 50 respectively abut against the flange 442 and one side surface of the pad 60. The pad 60 is positioned between the elastic member 50 and the keys 30 and is pushed by the elastic member 50 to abut against the keys 30 via the other side surface thereof. Then, the keys 30 are forced to move to the positions within the second grooves 221 and the first grooves 162. The stop portion 222 will be pushed by the movement of the keys 30 and indirectly moves the sleeve 22 toward the first position P1. The pad 60 is used to uniformly spread the elastic force of the elastic member 50 to the keys 30 such that the keys 30 can move steadily. In other embodiments, the pad 60 can be omitted. The elastic member 50 can be directly positioned with its two ends abutting against the flange 442 and the keys 30 respectively. Similarly, the keys 30 could be driven to move as the result mentioned above.

With the design of the quick release device 100 mentioned above, in normal condition, the sleeve 22 of the wrench 20 will indirectly bear the elastic force of the elastic member 50 and is held on the first position P1, and the keys 30 are respectively positioned within the first grooves 162 and the second grooves 221. Thus, when the wrench 20 is forced to rotate, it can drive the axial sleeve 16 to rotate together through the linkage generated by the keys 30. In other words, when the sleeve 22 is at the first position P1, the mandrel 10 can be forced to rotate together with the wrench 20 such that the externally threaded portion of the mandrel 10 can be loosened or tightened with respect to the internally threaded hole of the front fork.

After completion of securing the wheels to the bicycle frame, for the quick release device 100 of this embodiment, the handle 24 of the wrench 20 can be adjusted to a safe position by the following steps to prevent its interference with surrounding components or happening of dangerous riding.

Figure 6:
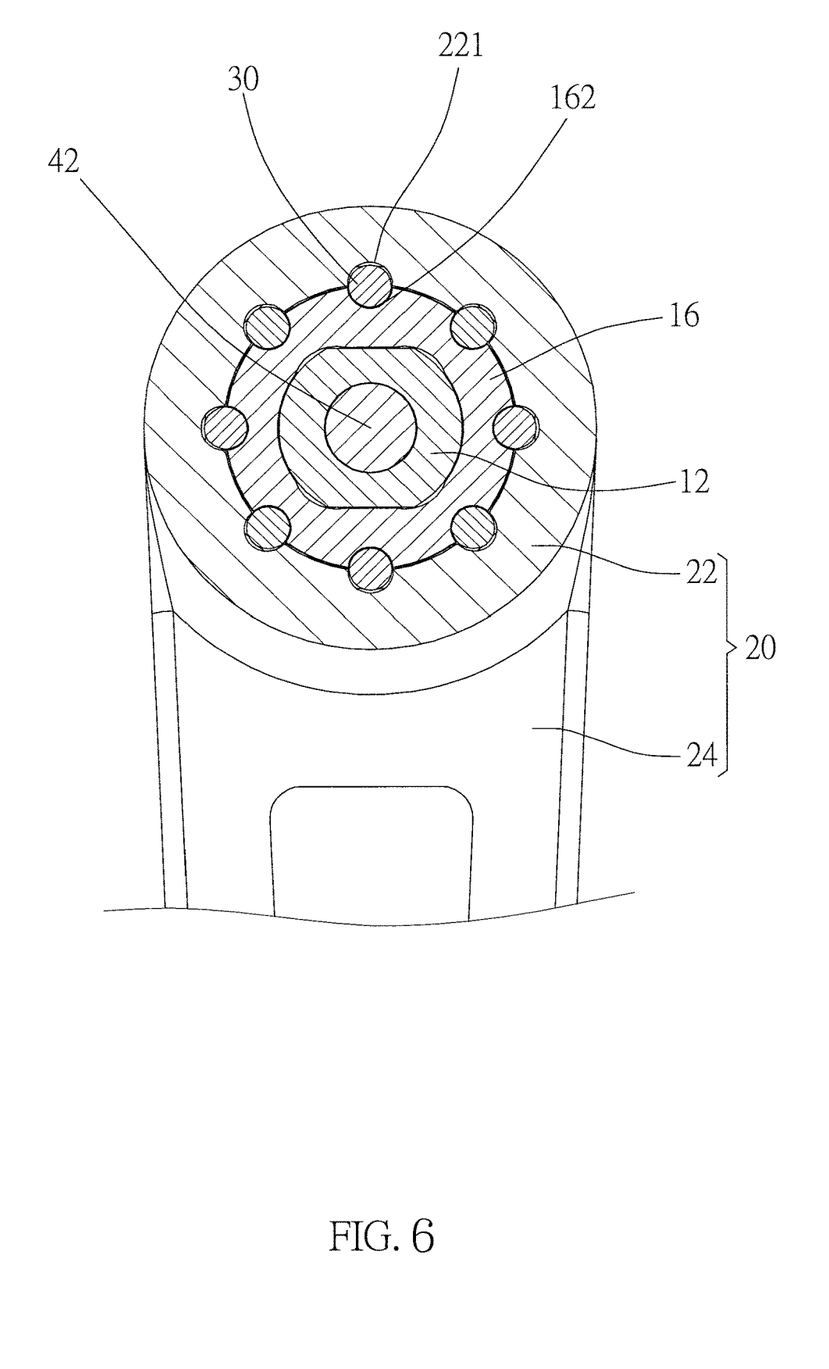
FIG. 6 is a cross-sectional view of the quick release device of FIG. 1 as viewed along line 6-6 of FIG. 1 which shows the corresponding positions of the components when the wrench is at the first position.
Figure 7:
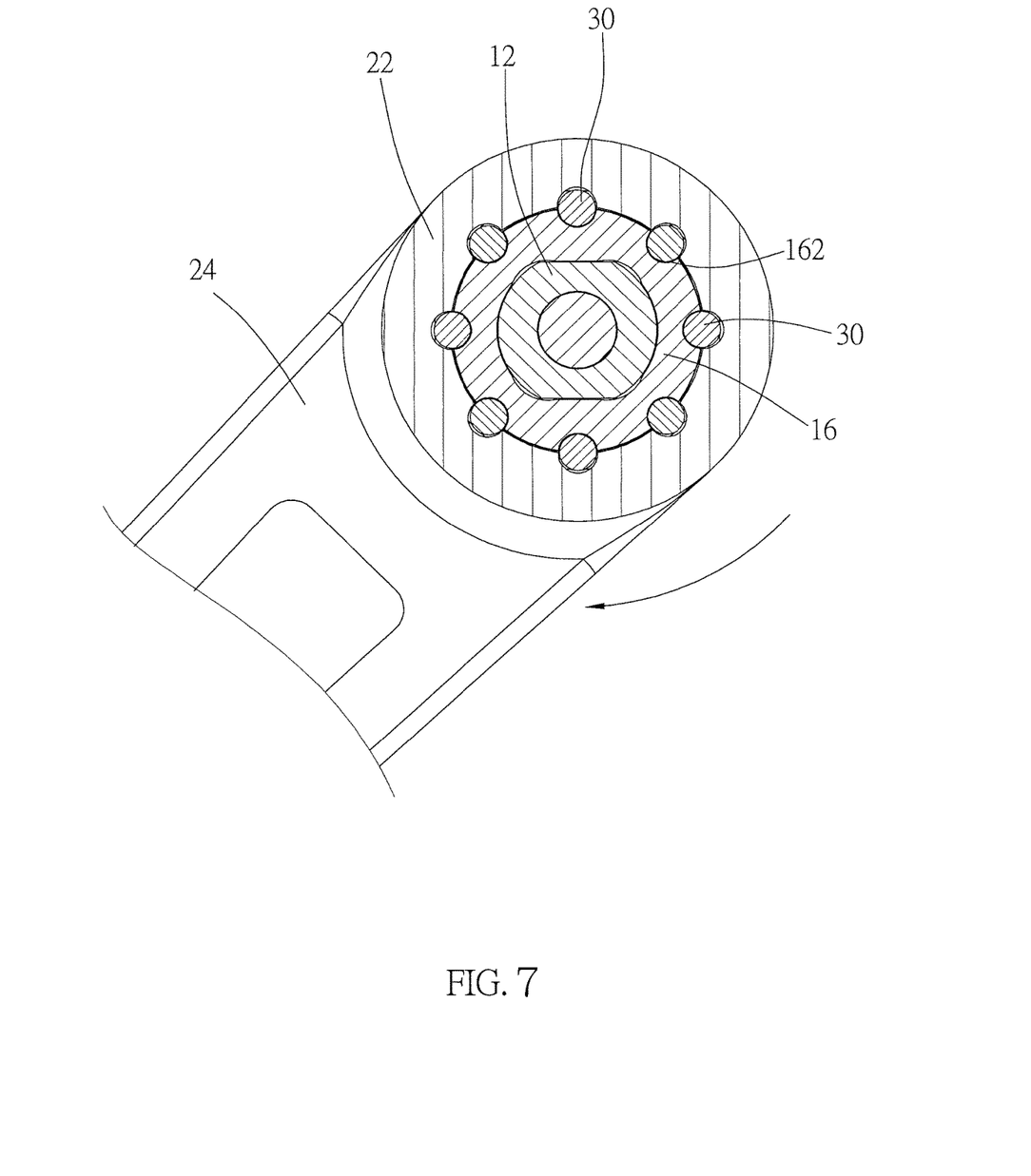
FIG. 7 is a cross-sectional view similar to FIG. 6 which shows the corresponding positions of each of the components when the wrench is rotated around the axis of the mandrel.

First, the sleeve 22 of the wrench 20 is controlled to move from the first position P1 to the second position P2. Wherein, the keys 30 are pushed to slide from the first grooves 162 to the guiding grooves 163 via the stop portion 222 of the sleeve 22, and the elastic member 50 is compressed such that the linkage between the wrench 20 and the mandrel 10 cannot be generated by the keys 30. Then, the handle 24 can be moved to a proper position (as shown in FIG. 6 and FIG. 7) by rotating the wrench 20 without linking to the mandrel 10. Wherein, it is preferable that the handle 24 is positioned upwardly or backwardly.

In the rotation process of the sleeve 22, the keys 30 are driven to rotate together that each of the keys 30 are moved from one of the guiding grooves 163 to another one of the guiding grooves 163 clockwise (or counterclockwise). When the handle 24 is moved to a preferred position, the control applied to the sleeve 22 can be released. Then, the elastic energy released by the compressed elastic member 50 can force the keys 30 to slide into the first grooves 162, and indirectly drive the sleeve 22 to move back to the first position P1 (as shown in FIG. 4).

Each of the guiding grooves 163 is adapted to be connected with each of the first grooves 162 such that when the keys 30 bear the elastic force of the elastic member 50, each of the guiding grooves 163 can guide each of the keys 30 to return to corresponding one of the first grooves 162 successfully. Then, an effect to the linkage resulted from to the collision between the keys 30 and the walls of the grooves can be prevented. Moreover, in this embodiment, each of the keys 30 respectively contacts the circular arc surfaces of each of the guiding grooves 163 and each of the first grooves 162 such that friction interference of the keys 30 during the sliding process is small and friction loss generated between the keys 30 and the axial sleeve 16 can be eased. Besides, in this embodiment, for incorporating a light-weight feature into bicycles, most of the assemblies are made of aluminum alloy (also can be made of other materials with small specific gravity), and only the keys 30 are made of high-strength and non-deformable steel (also can be made of other high-strength materials). Whereby, it can sustain greater stress and can carry out the linkage operation successfully.

It must be pointed out that the embodiments described above are only some embodiments of the present invention. All equivalent structures which employ the concepts disclosed in this specification and the appended claims should fall within the scope of the present invention.

What is claimed is:

1. A quick release device for bicycle wheel, comprising:
a mandrel, comprising a combination part which a plurality of first grooves are formed parallel to an axis of the mandrel on an external annular surface of the combination part;
a wrench, comprising a sleeve rotatably mounted on the combination part which at least one second groove is formed on an internal annular surface of the sleeve and can be opposed to one of the first grooves, wherein the sleeve is moved between a first position and a second position on the combination part along the axis of the mandrel, and the second groove is opposed to one of the first grooves when the sleeve is at the first position;
at least one key, which is positioned within one of the first grooves and the second groove when the sleeve is at the first position, and detached from one of the first grooves when the sleeve is at the second position;
a limiting member, which is fitted to the combination part of the mandrel and comprises a stopper; and
an elastic member, which is positioned between the at least one key and the stopper and adapted to drive the at least one key to move to one of the first grooves.

2. The quick release device for bicycle wheel of claim 1, wherein the sleeve comprises a stop portion, and the least one key is positioned between the stop portion and the elastic member.

3. The quick release device for bicycle wheel of claim 1, wherein the mandrel comprises a shaft and an axial sleeve which the axial sleeve is unrotatably mounted on one terminal of the shaft to constitute the combination part, and the first grooves are positioned on an external annular surface of the axial sleeve.

4. The quick release device for bicycle wheel of claim 3, wherein a plurality of guiding grooves are formed parallel to the axis of the mandrel on the external annular surface of the axial sleeve with an equivalent number of the first grooves; each of the guiding grooves is connected with each of the first grooves; and the at least one key is positioned within one of the guiding grooves and the second groove when the sleeve is at the second position.

5. The quick release device for bicycle wheel of claim 3, wherein the shaft comprises an internally threaded hole at the terminal mounted with the axial sleeve; the limiting member is constituted by a bolt and a limiting tube; the limiting tube is mounted on a head of the bolt and the bolt is engaged with the internally threaded hole; and the limiting tube comprises a flange formed on an exterior surface thereof to constitute the stopper of the limiting member.

6. The quick release device for bicycle wheel of claim 1, further comprising a pad positioned between the elastic member and the at least one key.

7. The quick release device for bicycle wheel of claim 6, wherein the elastic member comprises a spring which two terminals of the elastic member are respectively abutted against the stopper and one side surface of the pad, and the other side surface of the pad is abutted against the at least one key.

* * * * *